United States Patent
Krueger et al.

(10) Patent No.: US 9,617,435 B2
(45) Date of Patent: Apr. 11, 2017

(54) CLEAR MAGNETIC INTAGLIO PRINTING INK

(75) Inventors: Jessica Krueger, Savigny (CH); Pierre Degott, Crissier (CH); Claude-Alain Despland, Prilly (CH); Christine Reinhard, Prilly (CH); Andrea V. Firth, Ottawa (CA)

(73) Assignees: SICPA HOLDING SA, Prilly (CH); BANK OF CANADA, Ottawa, ON (CA)

( * ) Notice: Subject to any disclaimer, the term of this patent is extended or adjusted under 35 U.S.C. 154(b) by 651 days.

(21) Appl. No.: 13/263,643

(22) PCT Filed: Apr. 9, 2010

(86) PCT No.: PCT/EP2010/054716
§ 371 (c)(1),
(2), (4) Date: Dec. 21, 2011

(87) PCT Pub. No.: WO2010/115986
PCT Pub. Date: Oct. 14, 2010

(65) Prior Publication Data
US 2012/0091701 A1 Apr. 19, 2012

(30) Foreign Application Priority Data

Apr. 9, 2009 (WO) .................. PCT/IB2009/005227

(51) Int. Cl.
*B32B 3/00* (2006.01)
*B32B 5/16* (2006.01)
(Continued)

(52) U.S. Cl.
CPC ......... *C09D 7/1225* (2013.01); *C09D 7/1275* (2013.01); *C09D 7/1283* (2013.01);
(Continued)

(58) Field of Classification Search
CPC ...... B42D 15/00; B42D 15/10; C09D 7/1225; C09D 7/1275; C09D 7/1283;
(Continued)

(56) References Cited

U.S. PATENT DOCUMENTS 3,599,153 A 8/1971 Lewis et al.
3,618,765 A 11/1971 Cooper et al.
(Continued)

FOREIGN PATENT DOCUMENTS

CN 1082572 A 2/1994
CN 1505668 A 6/2004
(Continued)

OTHER PUBLICATIONS

International Search Report (ISR) for Application No. PCT/EP2010/054716, Date: Oct. 25, 2010, pp. 1-4.
(Continued)

*Primary Examiner* — Moshe Wilensky
*Assistant Examiner* — Justin V Lewis
(74) *Attorney, Agent, or Firm* — Greenblum & Bernstein, P.L.C.

(57) ABSTRACT

The invention discloses an ink for the engraved steel die printing process, having a viscosity at 40° C. between 3 Pa·s to 15 Pa·s, preferably 5 to 10 Pa·s, and having a polymeric organic binder and magnetic pigment particle, characterized in that said magnetic pigment particles comprises a magnetic core material which is surrounded by at least one layer of another material. The surrounding layers, single or in combination, confer the pigment particle particular optical properties in the visible and/or in the near IR, chosen from high specular or diffuse reflectance, spectrally selective absorption or reflection, and angle-dependent absorption or reflection, and allow for the formulation of inks having a large gamut of color and other optical functionalities.

33 Claims, 3 Drawing Sheets

Left side:

Orange ink based on standard soft magnetic iron pigment

Right side:

Same ink as on left side but with coated iron pigment

(51) Int. Cl.
  *B32B 7/00* (2006.01)
  *B05D 7/00* (2006.01)
  *C09D 7/12* (2006.01)
  *C09D 11/037* (2014.01)
  *B41M 1/10* (2006.01)
  *B41M 3/14* (2006.01)
  *C08K 3/08* (2006.01)
  *C08K 3/22* (2006.01)
  *C08K 9/02* (2006.01)

(52) U.S. Cl.
  CPC ............ *C09D 11/037* (2013.01); *B41M 1/10* (2013.01); *B41M 3/14* (2013.01); *C08K 3/08* (2013.01); *C08K 3/22* (2013.01); *C08K 9/02* (2013.01)

(58) Field of Classification Search
  CPC .......... C09D 11/037; C08K 3/22; C08K 3/08; C08K 9/02; B41M 1/10; B41M 3/14
  USPC ............... 283/72, 95, 96, 114; 427/215–221; 428/206
  See application file for complete search history.

(56) References Cited

U.S. PATENT DOCUMENTS

| | | | |
|---|---|---|---|
| 4,966,628 A | 10/1990 | Amon et al. | |
| 5,118,529 A | 6/1992 | Klinedinst | |
| 5,543,219 A | 8/1996 | Elwakil | |
| 5,665,429 A | 9/1997 | Elwakil | |
| 6,030,118 A * | 2/2000 | Schneider et al. | 374/160 |
| 6,187,439 B1 | 2/2001 | Elwakil | |
| 6,310,118 B1 | 10/2001 | Atarashi et al. | |
| 6,666,991 B1 | 12/2003 | Atarashi et al. | |
| 7,691,468 B2 * | 4/2010 | Benninger | B05D 3/207 283/82 |
| 2002/0160194 A1 | 10/2002 | Phillips et al. | |
| 2003/0143400 A1 | 7/2003 | Phillips et al. | |
| 2003/0170471 A1 | 9/2003 | Seto et al. | |
| 2004/0028905 A1 | 2/2004 | Phillips et al. | |
| 2005/0123755 A1 * | 6/2005 | Argoitia et al. | 428/402 |
| 2007/0241553 A1 * | 10/2007 | Heim | B42D 25/355 283/91 |
| 2008/0136160 A1 * | 6/2008 | Leenders | 283/72 |
| 2008/0241492 A1 | 10/2008 | Maeder et al. | |
| 2009/0184169 A1 | 7/2009 | Degott et al. | |
| 2009/0212554 A1 * | 8/2009 | Lewis | B41M 3/14 283/85 |
| 2010/0090455 A1 * | 4/2010 | Boswell | B41F 11/02 283/57 |
| 2010/0140916 A1 * | 6/2010 | Firth | B82Y 30/00 283/82 |

FOREIGN PATENT DOCUMENTS

| | | | |
|---|---|---|---|
| CN | 101316906 | 12/2008 | |
| CN | 101802111 | 8/2010 | |
| EP | 0 340 163 | 11/1989 | |
| EP | 0 432 093 | 6/1991 | |
| EP | 0 959 108 | 11/1999 | |
| EP | 1050782 A1 * | 11/2000 | |
| EP | 1 138 743 | 10/2001 | |
| EP | 1 630 207 | 3/2006 | |
| EP | 1 650 042 | 4/2006 | |
| EP | 1 854 852 | 11/2007 | |
| EP | 1 790 701 B1 | 1/2009 | |
| GB | 222523 A * | 10/1924 | |
| JP | 10-060350 | 3/1998 | |
| JP | 2004-518565 | 6/2004 | |
| WO | 93/23795 | 11/1993 | |
| WO | WO 2005002866 A1 * | 1/2005 | B05D 3/207 |
| WO | 2007/060133 | 5/2007 | |
| WO | WO 2007091094 A1 * | 8/2007 | B41M 3/14 |
| WO | WO 2008061930 A1 * | 5/2008 | B41F 11/02 |
| WO | 2008/148201 | 12/2008 | |
| WO | WO 2008148201 A1 * | 12/2008 | B82Y 30/00 |

OTHER PUBLICATIONS

Japanese Office Action issued with respect to Japanese Patent App. 2012-504032, mailed Jan. 21, 2014, along with an English language translation.

Chinese Office Action issued with respect to Chinese Patent App. No. 201080016858.7, dated Mar. 5, 2014, along with an English language translation.

Ukranian Office Action issued with respect to Ukranian Patent App. No. a 2011 12942, dated May 16, 2014, along with an English language translation.

Taiwanese Office Action issued with respect to Taiwanese Patent Application No. 099110871, issued Jun. 18, 2014, along with an English language translation.

Japanese Office Action for Japanese Patent Application No. 2012/504032, mailed Aug. 4, 2015, along with an English language translation.

Office Action issued in Japanese Patent Appl. No. 2014-259186, mailed Oct. 27, 2015, along with an English language translation.

* cited by examiner

Left side:
Orange ink based on standard soft magnetic iron pigment
Right side:
Same ink as on left side but with coated iron pigment Same inks as in 1.a but transformed in grey scale IR response (filter 850nm) of inks described in 1.a

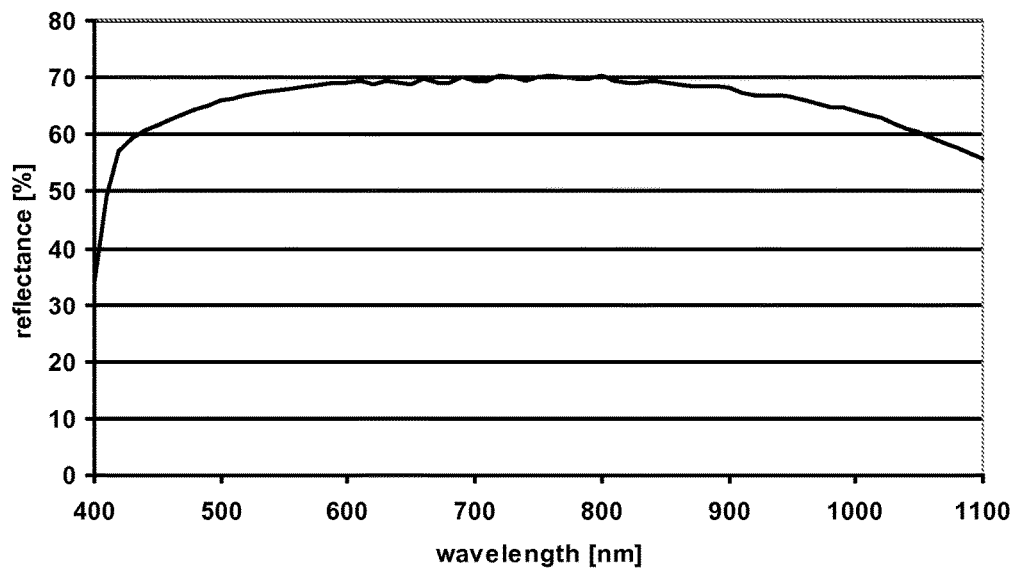
Fig. 2a: IR response of transparent magnetic intaglio ink
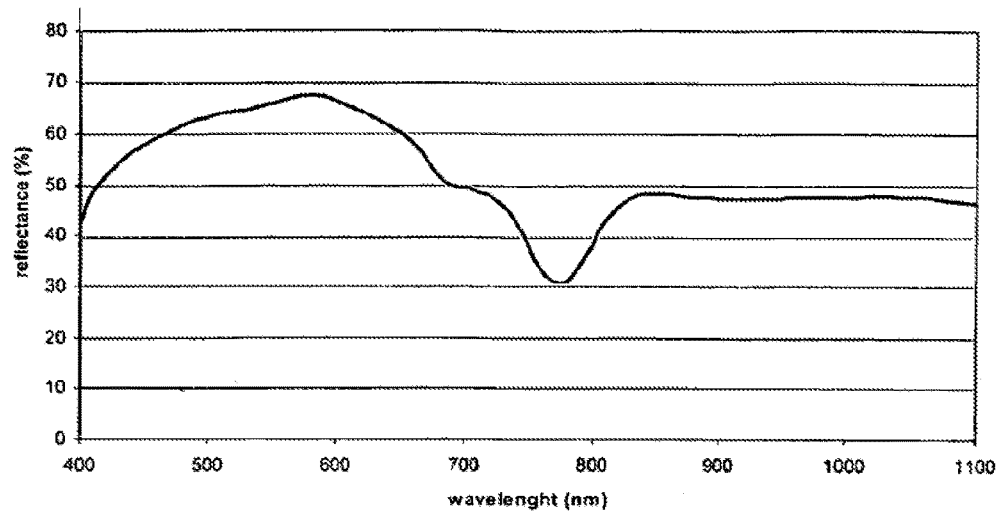
Fig. 2b: IR response of transparent magnetic intaglio ink with additional specific IR absorption peaks.

Example of an application on a banknote

CLEAR MAGNETIC INTAGLIO PRINTING INK

FIELD OF THE INVENTION

The present invention relates to security documents, such as banknotes, passports or cards, and is particularly concerned with a new intaglio printing ink composition comprising a clear magnetic pigment.

BACKGROUND OF THE INVENTION

Magnetic ink has been used since long in the field of banknote printing, to confer the printed currency an additional, covert, security element. Features printed with magnetic ink lend themselves as well for machine authentication, given that magnetism can be easily sensed by electronic means.

Examples for the use of magnetic currency features are disclosed in U.S. Pat. No. 3,599,153 and in U.S. Pat. No. 3,618,765. The magnetic currency features are preferably applied through the "copperplate intaglio" printing process, which is capable of depositing a sufficiently high amount of magnetic material on the paper so as to allow for its detection and sensing.

Banknote printing is characterized by the use of the "copperplate intaglio" printing process (engraved steel die rotary printing process), which constitutes an element of security on it own and provides the printed document with a distinct tactility.

In engraved steel die rotary printing, a rotating engraved cylinder carrying the pattern or image to be printed, is supplied with ink by one or more template inking cylinders, by which a pattern of inks of different color is transferred to the printing cylinder. Subsequent to inking, any excess of ink on the plain surface of the printing cylinder is wiped off by a rotating wiping cylinder covered by a "plastisol".

The remaining ink in the engraving of the printing cylinder is transferred under pressure onto the substrate to be printed, which may be paper or plastic material in sheet or web form. During the printing process high pressure is applied between the engraved cylinder and substrate to be printed, causing deforming (embossing) of the latter. This high pressure printing process results in the characteristic touch of a banknote.

Because of the unique characteristics of rotary intaglio printing process and of the corresponding printing machines, the inks used in this printing process must be specifically formulated.

Intaglio inks are characterized by their pasty consistency; generally the viscosity of intaglio inks for the engraved steel die printing process is comprised within 1 to 15 Pa·s, more specifically within 3 to 8 Pa·s at 40° C. at a shear rate of 1000 $sec^{-1}$. Intaglio inks are also characterized by their high solids contents, of typically more than 50% by weight.

A particular problem encountered with magnetic intaglio inks is their generally rather dark appearance and thus their limited accessible color gamut, due to the dark color of the known magnetic pigments: $Fe_2O_3$ which has a brown-red color; $Fe_3O_4$ which is black; or ferrite materials which are mostly dark grey; Lighter shade pigments such as soft magnetic metallic iron also appear grey in an ink. The dark color of the known magnetic pigments does not allow for the formulation of inks having light colors, such as orange, yellow or white, and limits thus the freedom for realizing artistic designs using magnetic inks. Clear magnetic pigments, and intaglio inks comprising such pigments, are therefore highly desirable, because they would allow for magnetic printed designs in any desired shade. The available magnetic intaglio inks do not currently allow a flexible integration into colored banknote designs, as to color, surface coverage and location.

EP 1 650 042 A1 discloses an intaglio printing ink comprising magnetic flake pigment, carrying on each side a color-generating interference layer sequence. The inks of EP 1 650 042 have the advantage that inks of vivid colors can be realized, through the use of magnetic particles having such vivid interference color coatings. The pigment particles of EP 1 650 042 are, however, not resistant to corrosion, due to the exposure, at the flake edges, of the flake's metal layers to the ink medium.

A printing ink for the printing of documents by the method of engraved steel die printing, comprises, further to the pigment, other print forming ink solids containing oleoresinous components; at least one volatile organic solvent to be evaporated during or after printing; and a film forming macromolecular hydrophilic surface active composition in full or partial replacement of said oleoresinous components, in combination or not with lower molecular weight surfactants. The amount of said volatile organic solvents is less than about 15% by weight of the total weight of the printing ink. The macromolecular hydrophilic surface active composition is preferably selected from anionic substances being the salts of carboxylic, phosphonic or sulfonic acid groups in said macromolecules with metals or amines.

Copperplate intaglio inks typically comprise a significant amount of macromolecular or low molecular weight surfactant, embodied as a partially neutralized carboxylic resin, in order to i) promote the adhesion of the ink to the cellulosic printing substrate, and ii) to allow for an easy cleaning of the wiping cylinder, using a basic aqueous surfactant solution. These surfactants are usually species carrying acid functions, partially neutralized with organic or inorganic bases, with a remaining acid number. The macromolecular hydrophilic surface-active composition is preferably selected from anionic substances being the salts of partially neutralized carboxylic, phosphonic or sulfonic acid groups in said macromolecules with metals or amines. Intaglio printing inks for this printing process have been disclosed in EP 0 340 163 B1 and EP 0 432 093 B1. Alternatively intaglio inks may also contain entities carrying non-neutralized acidic groups which are only neutralized when put in contact with the basic wiping solution, such as to allow for the cleaning of the wiping cylinder.

On the other hand, these acidic or partially neutralized intaglio ink components are a frequent cause for the corrosion of pigments, in particular metallic pigments such as bronze powders. Soft magnetic carbonyl iron powder, e.g, is known not to be stable in a carboxylic resin containing intaglio ink. The partially neutralized carboxylic resin in particular supplies, on the one hand, protons for the oxidation of the iron metal, according to the equation:

$$2\text{-COOH} + Fe \rightarrow 2\text{-COO}^- + Fe^{2+}H_2,$$

On the other hand it also acts as a complexing/solubilizing agent for the liberated $Fe^{2+}$ ion in the ink medium, preventing it from forming an oxide protecting layer on the iron metal:

$$Fe^{2+} + n\text{-COO}^- \rightarrow [Fe(\text{---COO})_n]^{(n-2)-}$$

This solubilization of the oxidized iron continuously liberates the metal surface for further attack. The dissolved metal, on the other hand increases the viscosity of the ink until reaching a point where the latter is no longer printable.

Intaglio inks comprising metallic iron pigment tend therefore to have a decreased shelf life. A magnetic iron containing intaglio ink with higher shelf life would be highly appreciated by the printer.

There is thus a need for magnetic intaglio printing inks not showing the shortcomings of the prior art. Accordingly, it is an object of the present invention to respond to this need.

BRIEF DESCRIPTION OF THE DRAWINGS

FIG. 2a shows the IR response of transparent magnetic intaglio ink. FIG. 2b shows IR response of transparent magnetic intaglio ink with additional specific IR absorption peaks.

DISCLOSURE OF INVENTION

Figure 1A:
FIG. 1a demonstrates the difference in visible shade between an orange ink based on a coated and an uncoated iron pigment having a same magnetic signal.

It has been surprisingly found, that it is possible to formulate magnetic intaglio inks having a clear shade, allowing thus for making inks having any desired shade, if the intrinsic dark color of the magnetic pigment particle is masked by a special coating of the particle. The coating must hereto be selected so as to modify the otherwise dark grey or brown optical appearance of the pigment particle to preferably a bright-metallic to white color. It has furthermore been found that certain types of soft-magnetic iron ("carbonyl iron") pigments, which are not stable in a carboxylic resin containing intaglio ink medium, are rendered compatible with this type of ink medium by the said coating of the pigment particle, such that the herein disclosed intaglio inks have also a much increased shelf life. It has also be found that multiple coatings of a magnetic particle allow to confer the magnetic particle almost any desired "body color", such as to allow for a large gamut of color and other optical functionalities of the corresponding magnetic inks.

Thus, the present invention discloses an ink for the engraved steel die printing process, having a viscosity at 40° C. between 3 Pa·s to 15 Pa·s, preferably 5 to 10 Pa·s, and comprising a polymeric, carboxylic groups containing organic binder and magnetic pigment particles, characterized in that said magnetic pigment particle comprises a magnetic core material which is surrounded (coated) by at least one layer of another material.

The preferred magnetic core material is a carbonyl iron particle. Carbonyl iron is a soft-magnetic grey iron powder, prepared by the thermal decomposition of iron pentacarbonyl. It consists of spherical micro-particles of diameter typically of the order of 1 to 10 μm. Carbonyl iron can be obtained from BASF and other suppliers, and is used in electronics (magnetic cores for high-frequency coils), in powder metallurgy, in stealth coatings, in magneto-rheological fluids, as well as in pharmaceutical applications. "Soft-magnetic" means that the particle has about zero magnetic remanence.

Other magnetic materials may, however, be used as well to embody the present invention. The magnetic core material according to the present invention is preferably selected from the group consisting of nickel, cobalt, iron and the iron containing alloys and oxides. In a more preferred embodiment the magnetic core particle according to the present invention is selected from iron and its oxides, in particular $Fe_2O_3$ and $Fe_3O_4$. Most preferred is a carbonyl iron particle.

The coating layer surrounding the magnetic core material is preferably from titanium dioxide. Such coating can be applied through a wet coating process such as disclosed in EP 1 630 207 A1. Titanium dioxide is an inert material, which is completely insoluble in the carboxylic resin containing ink medium. Titanium dioxide can also be applied through a chemical vapor deposition (CVD) process in fluidized bed, as disclosed in U.S. Pat. No. 5,118,529. Titanium dioxide is a high refractive index material (n=1.9), which, when applied in quarter-lambda thickness (65 nm at 500 nm wavelength) exhibits strong reflection of the incident light, conferring the so coated particle a clear appearance.

The shape of the magnetic core material used in the present invention includes isotropic bodies such as a sphere, and nearly spherical shapes, as well as polyhedrons and acicular bodies, such as obtained by crystallization. Also useful is a powder having irregular particle shape such as obtained by grinding a material.

In a preferred embodiment, the magnetic core material according to the present invention is surrounded by at least two layers of other materials; the second layer is chosen so as to confer the particle particular optical properties.

A preferred second layer material is silver; such as can be deposited onto the pre-coated particles using a wet chemical method according to EP 1 630 207. The resulting particles have a very clear (light) shade and allow for the formulation of a clear magnetic ink.

The first and the second layers can be chosen, as to their material and thickness, such as to cooperatively produce an optical effect sought, together with the core material. In such a way the particle can be designed to exhibit high reflectance, spectrally selective absorption, or angle-dependent color. To achieve high reflectance, the second layer is preferably of aluminum or silver, and has a thickness such as to produce about total reflection. A preferred layer thickness is between 5 to 40 nm.

To achieve spectrally selective absorption, the first layer is of a high refractive index material, such as $TiO_2$, and has a thickness of multiple half-waves of a design wavelength, and the second layer is a semi-transparent layer, e.g. of Cr or Ni, having a thickness of the order of 5 nm.

To achieve angle-dependent color, the first layer is of a low-refractive index material, such as $SiO_2$, and has a thickness of a multiple of half-waves of a design of wavelength, and the second layer is a semi-transparent layer, e.g of Cr or Ni, of a thickness of the order of 5 nm.

In still another embodiment the said magnetic core material is surrounded by at least three layers of other materials. The third layer may be a protecting layer, made e.g. of a polymer, of $TiO_2$, or of another suitable material, to additionally protect the second layer from corrosion, and to preserve thus its optical function.

According to the present invention, the materials which surround the magnetic core material may thus be independently selected from the group of organic materials and the group of inorganic materials.

According to a preferred embodiment the group of organic materials are selected from the polyacrylates, in particular poly(methyl methacrylate) (PMMA), the polystyrenes, parylene, 3-methacryloxypropyl trimethoxysilane (TMP). In a most preferred embodiment, the organic materials are PMMA and/or TMP.

According to a preferred embodiment, the group of inorganic materials consists of the metals aluminum, nickel, palladium, platinum, copper, silver, gold, and their alloys, the dielectric monoxides of magnesium and zinc, the dielectric sesquioxides of aluminum, yttrium, and the lanthanides, the dielectric dioxides of silicon, titanium, zirconium, and cerium, and the dielectric monosulfides of zinc and calcium.

In a most preferred embodiment the inorganic materials are each independently selected from $SiO_2$, $TiO_2$, $Y_2O_3$, and silver. In a more preferred embodiment inorganic materials are each independently selected from $SiO_2$, $TiO_2$, and silver. In another preferred embodiment inorganic material are selected from $TiO_2$ and silver. In an even more preferred embodiment inorganic material are selected from $SiO_2$ and silver.

In a particularly preferred embodiment the magnetic core particle is first surrounded by a layer of silver, followed by further layers which are each independently selected from organic materials and/or inorganic materials as described above. In this embodiment, the magnetic core particle is preferably selected from iron, $Fe_3O_4$ and/or $Fe_2O_3$, even more preferably from $Fe_3O_4$ and $Fe_2O_3$, and the first layer which surrounds the metal core is silver, and further layers are selected from inorganic materials as described above.

In another particularly preferred embodiment of the present invention the outmost layer which surrounds the magnetic core particle is of silver, and other layer(s) between the magnetic core particle and the silver layer are each independently selected from organic materials and/or inorganic materials as described above. In a most preferred embodiment the magnetic core particle is selected from iron, $Fe_3O_4$ and/or $Fe_2O_3$ more preferably from $Fe_3O_4$ and/or $Fe_2O_3$ and the outmost layer which surrounds the core is of silver and other layers between the core and the silver layer are selected from inorganic materials as above described. An example of such magnetic pigment particle is an iron particle coated with a first layer of $TiO_2$ and with as a second layer of silver.

All suitable deposition processes (physical and/or chemical) can be used to deposit the organic and/or inorganic layers onto the magnetic core material. As not limiting examples for the coating process are mentioned: chemical vapor deposition (CVD), and wet-chemical coating. In the case of forming an organic material film (resin film), use may be made of a method in which magnetic core materials are dispersed in a liquid phase and a resin film is formed on the particles by emulsion polymerization (liquid-phase polymerization method), or of a method in which the film is formed in a vapor phase (CVD) (PVD), or of still others methods known by the skilled one in the art.

The resulting magnetic pigment particle can thus be a coated monoparticle, but it can also be an agglomerate particle. In a more preferred embodiment the magnetic pigment particle is of spherical shape.

The size of the coated magnetic pigment particle according to the present invention is between 0.1 μm and 30 μm, such as to be suitable for the intaglio printing process, where generally the thickness of the deposited ink layer is of the order of 30 μm. According to the present invention the size of the particle is preferably between 1 and 20 μm, most preferably 5 and 10 μm.

The ink according to the present invention contains 3 to 70 wt % of said magnetic pigment particles, based on the total weight of the ink composition, preferably 10 to 50 wt %, most preferably 20 to 40 wt %. These concentrations of magnetic pigment particles provide for an efficient level of detection for the magnetic signal.

Interesting supplementary pigment properties can be obtained through the deposition of an appropriate outmost layer on the pigment particle, such as surface wetting properties and dispersion properties, which are helpful during the manufacturing of the ink and confer the ink a stable behavior during storage and during the printing process.

A further advantage of the present invention is that the coated magnetic core material pigment containing magnetic intaglio inks are stable over time, despite the fact that the ink resin has acid moieties in its composition which would attack neat or partially coated metals such as carbonyl iron. The magnetic pigment particles according to the present invention, having a multiply coated magnetic core show even an excellent corrosion resistance in acid and metal-complex-forming ink media. The pigment particle according to the invention does not cause complications or impose special requirements for the ink formulator in its industrial fabrication, as compared to conventional intaglio inks.

Multiple layers surrounding the magnetic core material, single or in combination, can be used to confer the pigment particle particular optical properties in the visible and/or in the near IR, chosen from high specular or diffuse reflectance, spectrally selective absorption or reflection, and angle-dependent absorption or reflection.

A particularly interesting characteristic obtainable by the superposition of multiple layers around a magnetic core material is spectrally selective reflection (color). Thus, alternatively superposing coatings having different refractive indexes on the surface of the magnetic core material, with thicknesses chosen such that the product of the refractive index of the substance constituting the film and the thickness of the film corresponds to one-fourth of a design wavelength in the optical range (200 nm to 2500 nm), then light of the design wavelength is reflected due to multiple interference at the optical boundary layers (Fresnel reflection).

Multiple coating can also be utilized to produce a magnetic pigment particle which reflects light and has a white appearance, by coating a magnetic core material, which may be of a magnetic metal, e.g., iron, cobalt, nickel, a magnetic alloy, e.g. Alnico, $SmCo_5$ $Nd_2Fe_{14}B$, or an iron oxide powder, by forming thereupon a layer of a high-reflectance metal, such as silver or aluminum as a first coating, further forming thereupon a layer of an oxide having a low refractive index such as silicon dioxide (n=1.45) as a second coating, in such a thickness that the product of the refractive index of the oxide and the thickness of the second coating is one-fourth a first design wavelength of visible light, and finally forming thereupon a layer of a high-refractive-index oxide, such as zirconium oxide (n=1.97) as a third coating, in such a thickness that the product of the refractive index of the material and the thickness of the third coating is one-fourth a second design wavelength of visible light; first and second design wavelength being preferably the same.

The use of interference coated magnetic particles in an intaglio ink presents several advantages in comparison with the use of uncoated magnetic particles in the same type of ink. First, magnetic materials on their own are mostly dark or strongly colored, which has a negative impact on the possible colors of the realizable printing inks and thus the colored magnetic features which can be printed by the intaglio printing process. The presence of multiple layers according to the invention around the magnetic core material of the particle provides not only a possibility to modify the natural color of the pigment, but furthermore confers it novel properties, such as own unusual color, e.g. blue or magenta, or even iridescent, or color shifting properties, as well as hidden optical features in the infrared spectral range.

In a particularly preferred embodiment, the intaglio ink comprises magnetic pigment according to the invention, wherein the said magnetic pigment is chosen to have a bulk lightness L* higher than 60 according to the CIELAB (1976) scale, preferably higher than 75, most preferably higher than 80.

In a further preferred embodiment of the present invention the ink has a diffuse IR reflectance between 800 and 1000 nm—which is higher than 60%.

Another object of the present invention is a security document, in particular a banknote, carrying at least in part an ink as described above.

Another object of the present invention is a security document, in particular banknote, document of identification, carrying a layered construction comprising at least one color layer which contains magnetic pigment particles comprising a magnetic core material which is surrounded by at least one layer of another material.

A further embodiment of the invention is a security document comprising an ink according to the present invention printed with an intaglio plate having zones of different engraving depth, such as to result in printed zones of different levels of magnetic signal. This particularity is useful to confer another level of security to the document.

A further embodiment of the invention is a security document comprising an ink according to the present invention printed in combination with an ink of the same color but not displaying magnetic properties. This ink used in combination with an ink of the prevent invention can further be IR transparent or IR absorbing somewhere in the wavelength range 700 nm to 2500 nm such as disclosed in EP-B-1 790 701.

Another object of the invention is the use of an ink according to the present invention for the engraved steel die printing process for the printing of a security document, such as a banknote, a passport, a check, a voucher, an ID- or transaction card, a stamp, a label.

The security document according to the present invention is obtained by the process comprising the step of applying an ink according to the present invention onto a document by the means of the engraved steel die printing process.

The printing ink according to the present invention could also be formulated to be energy-curable, e.g. able to be cured by UV light or EB (electron beam) radiation, and typically includes a binder comprising one or more oligomers and/or reactive monomers. Corresponding formulations are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited.

Suitable oligomers (also referred to as prepolymers) include epoxy acrylates, acrylated oils, urethane acrylates, polyester acrylates, silicone acrylates, acrylated amines, and acrylic saturated resins. Further details and examples are given in "Chemistry & Technology of UV & EB Formulation for Coatings, Inks & Paints", Volume II: Prepolymers & Reactive Diluents, edited by G Webster.

Due to the high viscosity of most oligomers, diluents are often required to reduce the overall viscosity of the energy curing ink or coating formulation, so as to assist ink formulation and printing. Diluents may include common organic solvents, water, or "reactive" monomers which upon curing are incorporated into the film. Reactive monomers are typically chosen from acrylates or methacrylates, and can be monofunctional or multifunctional. Examples of multifunctional monomers would include polyester acrylates or methacrylates, polyol acrylates or methacrylates, and polyether acrylates or methacrylates.

In the case of inks to be cured by UV radiation, it is usually necessary to also include at least one photoinitiator to initiate the curing reaction of the oligomers and reactive monomers upon exposure to UV or shortwave visible radiation.

Examples of useful photoinitiators can be found in standard textbooks such as "Chemistry & Technology of UV & EB Formulation for Coatings, Inks & Paints", Volume III, "Photoinitiators for Free Radical Cationic and Anionic Polymerisation", 2nd edition, by J. V. Crivello & K. Dietliker, edited by G. Bradley and published in 1998 by John Wiley & Sons in association with SITA Technology Limited. It may also be advantageous to include a sensitizer in conjunction with the photoinitiator in order to achieve efficient curing.

The ink according to the present invention may also contain about 1 to 5%, based on the weight of the finished ink, of a wax, in order to improve scuff resistance. Suitable waxes include carnauba waxes, montan waxes, polytetrafluoroethylene waxes, polyethylene waxes, Fischer-Tropsch waxes, silicone fluids and mixtures thereof.

Other additives may be incorporated in the ink, including but not limited to, adhesive reagents, antifoaming reagents, leveling reagents, flow reagents, antioxidants, ultraviolet absorbers, flame retardants, etc.

The inks of the present invention can be used on a standard intaglio press equipped with UV lamps, and the preferred plate temperature is in the range of between 40° C. and 80° C. The curing conditions for UV inks are known to the skilled in the art.

The invention is now further illustrated by the following non-limiting examples. Percentages are by weight. Those skilled in the art will recognize that many variations are possible within the spirit and scope of these examples, which intended to be defined by the following claims and their equivalents in which all terms are meant in their broadest reasonable sense unless otherwise indicated.

EXAMPLES

General Description

For each example the inks have been prepared by mixing the components of the formula listed below, except for the driers, together, and performing 3 passages on a SDY300 three-roll mill (one at 8 bars and 2 at 16 bars). The driers were added at last and mixed in for 15 minutes, and the finished ink was degassed under vacuum.

The viscosity was measured on a Haake RotoVisco 1 rotational rheometer at 1000 s−1 and 40° C. and adjusted with solvent if necessary.

For the pigmentation of the inks for Example 1 of the following color pigments can be used:

| | |
|---|---|
| White | C.I. Pigment White 6 |
| Yellow | C.I. Pigment Yellow 13 |
| Red | C.I. Pigment Red 170 |
| Green | C.I. Pigment Green 7 |
| Blue | C.I. Pigment Blue 15:3 |
| Violet | C.I. Pigment Violett 23 |

Process for Coating Metal Core Material (Iron Oxide):

1. Silver Coating:

Silver coated iron oxide particles were obtained by dispersing 70 g of iron oxide in 280 ml of distilled water and dropwise adding a silver nitrate solution (a mixture of 140 ml of ammonium hydroxide (28%), 720 ml of silver nitrate (8.7%) and 140 ml of ammonium hydroxide (28%)) at 70° C. under vigorous stirring. After an additional hour of continuous stirring at 70° C., 280 ml of a D-glucose solution (28%) was added rapidly. The obtained yellow precipitate was allowed to cool under stirring, filtered, washed with distilled water and finally dried at 80° C. for about 16 h.

2. $SiO_2$ Coating:

The so obtained silver coated iron oxide particles were further coated with $SiO_2$ by dispersing the corresponding pigment and 165 g polyvinylpyrrolidone (PVP K10) in a mixture of 600 ml of distilled water, 3 l of 28% ammonium hydroxide and 4.78 l of 1-propanol for one hour. After addition of 650 ml of tetraethoxysilane (TEOS) the mixture was stirred overnight at 150 rpm (for about 16 h) at room temperature. The slurry was then filtered and the resulting solid was washed with 2 l of distilled water while constantly stirring the filtrand. The resulting solid was dried in air for 5 h. The resulting product was further dried in an oven at 80° C. for about 16 h.

3. $TiO_2$ Coating $TiO_2$ coated iron was prepared by dispersing 4 g of iron in a solution of 100 ml of anhydrous ethanol containing 60 µl of a non-ionic surfactant, such as 0.4M Lutensol (BASF). After 15 min of throughout stirring 120 µl of titanium isopropoxide (TTIP) were added at once. The reaction was stirred for 2 h under inert atmosphere and for one night in air.

Example 1: Iron Pigment Coated with Silver and $TiO_2$

Light shade soft magnetic oxidative drying sheet fed intaglio ink for the water wipe copperplate intaglio printing process

| Composition | % |
| --- | --- |
| Long oil alkyd resin diluted in a high boiling point oil (to 80% solid content) | 14 |
| Alkylphenolic tung oil adduct diluted in a high boiling point oil (to 80% solid content) | 6 |
| Macromolecular surfactant as described in U.S. Pat. No. 4,966,628 | 20 |
| Coated Iron pigment | 9 |
| Colored Pigment | 6 |
| Titanium dioxide | 2 |
| Fluorinated wax | 2 |
| Carnauba wax | 5 |
| Talc | 1.5 |
| Vegetable oil and fatty acid esters | 2.5 |
| Mineral oil | 3 |
| Calcium carbonate (natural chalk) | 26.5 |
| Multi metal dryer (octoate salts of cobalt, manganese and zirconium diluted with a high boiling point mineral oil to 80% solid content) | 2.5 |

The so obtained inks were printed on a standard intaglio press onto banknote paper in the form of a pattern comprising visible colors and covert magnetic features. In this way, magnetic patterns, useful for the machine processing of currency, could be realized in complete independence of the visible aspect of the document.

For comparison, similar inks were prepared based on a conventional uncoated iron pigment. In order to obtain the same shade with a conventional iron pigment the pigment concentration had to be lowered to 20-50% of the original value (depending on the visible ink color) while increasing the titanium dioxide concentration to the maximum amount possible of 15%.

Figure 1B:
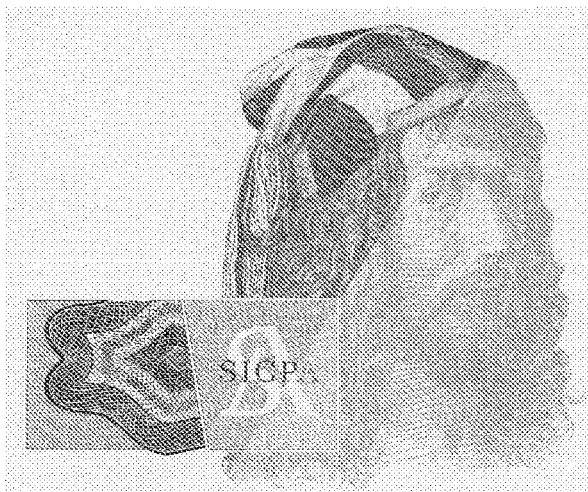
FIG. 1b shows the same inks as in FIGU. 1a but transformed in grey scale.
Figure 1C:
FIG. 1c shows a corresponding IR image (850 nm filter).
Figure 3:
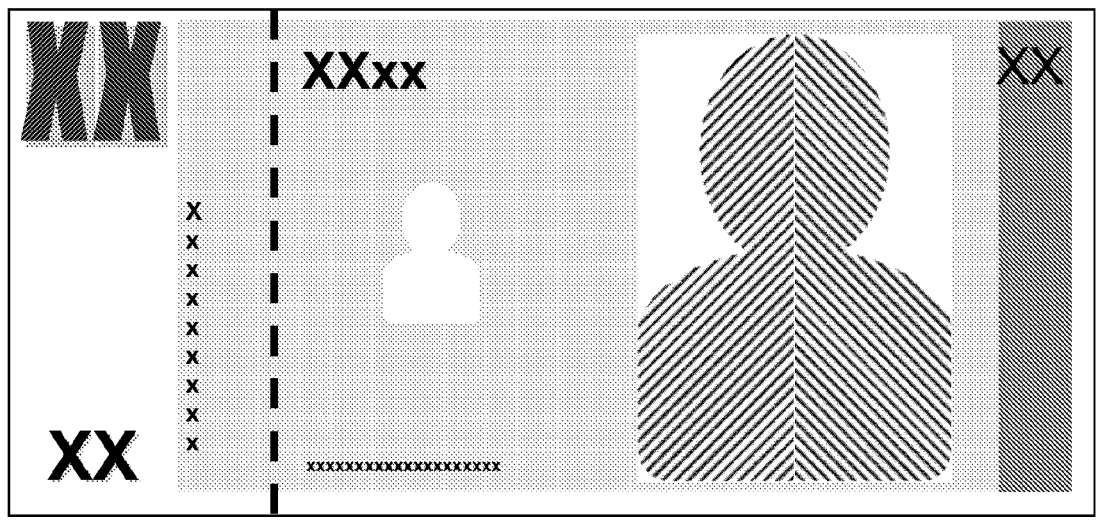
FIG. 3 shows an example of an application on a banknote.

On the other hand the difference in visible shade between an orange ink based on a coated and an uncoated iron pigment having a same magnetic signal is demonstrated in FIGS. 1a and 1b. The corresponding IR image (850 nm filter) is given in FIG. 1c.

Example 2: Coated Iron Oxides Pigments with Silver and $SiO_2$

Light shade hard magnetic oxidative drying sheet fed intaglio ink for the water wipe copperplate intaglio printing process

| Composition | % |
| --- | --- |
| Long oil alkyd resin | 7.5 |
| Alkylphenolic resin modified with tung oil in ink solvent 6/9 (S.I.C.) | 16 |
| Addition product of tung oil and maleic acid modified phenolic resin in a high boiling mineral oil (PKWF 28/31) | 25 |
| Polyethylene wax (mp 130° C.) | 1.5 |
| Calcium carbonate (natural chalk) | 13 |
| Coated Iron pigment | 15 |
| Colored Pigment | 6 |
| Ink solvent 6/9 (S.I.C.) | 6 |
| Cobalt Octoate drier (11% metal) | 0.1 |
| Manganese Octoate drier (10% metal) | 0.1 |

The viscosity of the ink was adjusted with "Ink Solvent 6/9" (Shell Industrial Chemicals) to a value between 5 and 10 Pa·s at 40° C.

The so obtained inks were printed on a standard intaglio press onto banknote paper in the form of a pattern comprising visible colors and covert magnetic features.

For comparison, similar inks were prepared based on a conventional uncoated iron oxide pigment. In order to obtain the same shade with a conventional magnetic pigment, the magnetic pigment concentration had to be lowered to 10-40% of the original value (depending on the visible ink color) while increasing the titanium dioxide concentration to a maximum amount possible of 15%.

Example 3: Iron Pigment Coated with Silver and $TiO_2$

Light shade soft magnetic oxidative drying sheet fed intaglio ink for the paper wipe copperplate intaglio printing process with specific IR absorption peaks.

| Composition | % |
| --- | --- |
| Long oil alkyd resin | 7.5 |
| Alkylphenolic resin modified with tung oil in ink solvent 6/9 (S.I.C.) | 16 |
| Addition product of tung oil and maleic acid modified phenolic resin in a high boiling mineral oil (PKWF 28/31) | 25 |
| Polyethylene wax (mp 130° C.) | 1.5 |
| Calcium carbonate (natural chalk) | 28.65 |
| Coated Iron pigment | 10 |
| Colored Pigment | 5 |
| Hexadeca-(3-ethoxythiophenolato)-phtalocyanato-zinc (II) | 0.15 |
| Ink solvent 6/9 (S.I.C.) | 6 |
| Cobalt Octoate drier (11% metal) | 0.1 |
| Manganese Octoate drier (10% metal) | 0.1 |

The viscosity of the ink was adjusted with "Ink Solvent 6/9" (Shell Industrial Chemicals) to a value between 5 and 10 Pa·s at 40° C.

For comparison reasons an clear shade magnetic ink with and without IR absorber were prepared. FIG. 2 compares the IR reflection spectra of the corresponding inks. This shows that the coated iron pigment does not only allow the use of a larger visible ink color gamut. Also special IR features can be added as the pigment does not itself contribute significantly to the IR absorption of the ink.

Example 4: Same Composition as Example 1 and 3 Further Coated with $SiO_2$

Light shade soft magnetic oxidative drying intaglio ink formulation for the water wipe copperplate intaglio printing process.

The pigments prepared for example 1 and 3, were further coated with $SiO_2$ by dispersing the corresponding pigments in 15 ml of anhydrous ethanol under high-speed mechanical stirring. In a first step a solution of 1 ml TEOS in 15 ml of ethanol was added at once. Then 0.11 ml of distilled water in 5 ml of anhydrous ethanol was added. The manipulations were done under an inert atmosphere. The slurry was stirred for further 6 h, and then the precipitate was filtrated and dried in vacuum.

A water containing, non-interleaving intaglio ink is manufactured according to the following formula:

| Composition | % |
| --- | --- |
| Long oil alkyd resin diluted in a high boiling point oil (to 80% solid content) | 10 |
| Alkylphenolic tung oil adduct diluted in a high boiling point oil (to 80% solid content) | 8 |
| Macromolecular surfactant as described in U.S. Pat. No. 4,966,628 | 15 |
| Sodium slat of sulfonated castor oil in water (solids content 60%) | 2 |
| Micronized polyethylene wax | 2 |
| Coated Iron pigment | 9 |
| Colored Pigment | 6 |
| High boiling point mineral oil | 3 |
| Calcium carbonate | 28 |
| Multi metal dryer (octoacte salts of cobalt, manganese and zirconium diluted with a high boiling point mineral oil to 80% solid content ) | 2 |
| Deionised water thickened with a cellulose ether (MC or sod-CMC 2.5% to 3%)* | 15 |

*The cellulose ether was chosen from the group of methylcellulose (MC) and/or sodium carboymethylcellulose (sod-CMC) and used as described by C. Baker, The Book and Paper Group Annual, vol. 1 (1982)

The driers and the water were added at last and mixed in for 15 minutes, and the finished ink was degassed under vacuum. The viscosity of the ink was adjusted to 10 Pa·s at 40° C.

For obtaining inks of corresponding colors, but without the magnetic feature, the magnetic pigment was replaced by the same weight amount of calcium carbonate. Magnetic and non-magnetic inks were printed as described. No difference in shade for the two inks was observed.

The invention claimed is:

1. A curable ink composition for engraved steel die printing having a viscosity between 3 Pa·s to 15 Pa·s at 40° C. and comprising:
   (A) pigment particles, each comprising
      (i) a magnetic core material, and
      (ii) at least one coating layer surrounding the magnetic core material, the coating layer being of a different material than the magnetic core material and selected from the following:
         a first layer of $TiO_2$ and a second layer of Al;
         a first layer of $TiO_2$ and a second layer of Cr or Ni;
         a first layer of $SiO_2$ and a second layer of Cr or Ni;
         a first layer of Ag and a second layer of $SiO_2$, $TiO_2$ or $Y_2O_3$;
         a first layer of Ag and a second layer of organic material selected from polyacrylates, polystyrenes, parylene, and 3-methacryloxypropyl trimethoxysilane (TMP);
         a first layer of $SiO_2$, $TiO_2$, or $Y_2O_3$ and a second layer of Ag;
         a first layer of organic material selected from polyacrylates, polystyrenes, parylene, and 3-methacryloxypropyl trimethoxysilane (TMP), and a second layer of Ag; or
         a first layer of Ag or Al, a second layer of $SiO_2$, and a third layer of $ZrO_2$; and
   (B) a polymeric organic binder comprising carboxylic groups.

2. The ink composition according to claim 1, wherein the viscosity is between 5 Pa·s to 10 Pa·s.

3. The ink composition according to claim 1, wherein the magnetic core material is surrounded by at least two coating layers of different materials than the core material.

4. The ink composition according to claim 3, wherein the magnetic core material is surrounded by at least three coating layers of different materials than the core material.

5. The ink composition according to claim 1, wherein the coating layers are each independently a result of chemical vapor deposition (CVD) or wet coating.

6. The ink composition according to claim 1, wherein the coating layers, single or in combination, confer desired surface properties and dispersion properties to the pigment particles.

7. The ink composition according to claim 6, wherein the coating layers, single or in combination, confer desired optical properties to the pigment particles in the visible and/or in the near IR range, wherein the optical properties are selected from the group consisting of high specular reflectance, diffuse reflectance, spectrally selective absorption, spectrally selective reflection, angle-dependent absorption, and angle-dependent reflection.

8. The ink composition according to claim 7, wherein the pigment particles have a bulk lightness L* higher than 60 according to the CIELAB (1976) scale.

9. The ink composition according to claim 8, wherein the pigment particles have a bulk lightness L* higher than 75 according to the CIELAB (1976) scale.

10. The ink composition according to claim 9, wherein the pigment particles have a bulk lightness L* higher than 80 according to the CIELAB (1976) scale.

11. The ink composition according to claim 7, having a diffuse IR reflectance between 800 nm and 1000 nm of higher than 60%.

12. The ink composition according to claim 1, wherein the size of the magnetic pigment particles is between 0.1 μm and 30 μm.

13. The ink composition according to claim 12, wherein the size of the pigment particles is between 1 μm and 20 μm.

14. The ink composition according to claim 13, wherein the size of the pigment particles is between 5 μm and 10 μm.

15. The ink composition according to claim 1, wherein the pigment particles are of spherical shape.

16. The ink composition according to claim 1, wherein the magnetic core material is selected from the group consisting of nickel, cobalt, iron, iron-containing alloys, and iron-containing oxides.

17. The ink composition according to claim 1, wherein the coating layers comprise organic and/or inorganic material.

18. The ink composition according to claim 17, wherein the organic material is selected from the group consisting of polyacrylates, polystyrenes, parylene, and 3-methacryloxypropyl trimethoxysilane (TMP).

19. The ink composition according to claim 18, wherein the polyacrylate is polymethylmethacrylate (PMMA).

20. The ink composition according to claim 17, wherein the inorganic material is selected from the group consisting of
- aluminum, nickel, palladium, platinum, copper, silver, gold, and their alloys;
- dielectric monoxides of magnesium and zinc;
- dielectric sesquioxides of aluminum and yttrium;
- lanthanides;
- dielectric dioxides of silicon, titanium, zirconium, and cerium; and
- dielectric mono sulfides of zinc and calcium.

21. The ink composition according to claim 1, wherein the pigment particles are present in an amount of 3 to 70 wt %, based on the total weight of the ink composition.

22. The ink composition according to claim 21, wherein the pigment particles are present in an amount of 10 to 50 wt %, based on the total weight of the ink composition.

23. The ink composition according to claim 22, wherein the pigment particles are present in an amount of 20 to 40 wt %, based on the total weight of the ink composition.

24. The ink composition according to claim 1, wherein the magnetic core material of the magnetic pigment particles is iron or iron oxide, and wherein the materials of the coating layers are silver, $TiO_2$ and/or $SiO_2$.

25. The ink composition according to claim 24, wherein the magnetic core material of the pigment particles is iron or iron oxide, a first coating layer surrounding the magnetic core material is silver and a second coating layer surrounding the magnetic core material is $TiO_2$.

26. The ink composition according to claim 25, wherein the magnetic core material is further coated with a third coating layer of $SiO_2$.

27. The ink composition according to claim 25, which further comprises an IR absorber.

28. The ink composition according to claim 24, wherein the magnetic core material of the pigment particles is iron or iron oxide, a first coating layer surrounding the magnetic core material is silver and a second coating layer surrounding the magnetic core material is $TiO_2$, and wherein the ink composition has a diffuse IR reflectance between 800 nm and 1000 nm of higher than 60% and a viscosity between 5 Pa·s to 10 Pa·s.

29. A method of printing a security document, comprising applying the ink composition according to claim 1 via engraved steel die printing onto a document.

30. The method of claim 29, wherein the security document is a banknote, a passport, a check, a voucher, an ID or transaction card, a stamp, or a label.

31. A security document comprising the ink composition according to claim 1.

32. The security document according to claim 31, wherein the ink composition is printed with an intaglio plate having zones of different engraving depth, such as to result in printed zones of different levels of magnetic signal.

33. The security document according to claim 31, wherein the ink composition is printed in combination with another intaglio ink having the same color but not displaying magnetic properties.

* * * * *